United States Patent
Suessmilch

[11] 3,886,932
[45] June 3, 1975

[54] OVERCURRENT PROTECTIVE CIRCUIT

[75] Inventor: Klaus Suessmilch, Munich, Germany

[73] Assignee: Fritz Schwarzer GmbH, Munich, Germany

[22] Filed: Feb. 14, 1974

[21] Appl. No.: 442,537

[30] Foreign Application Priority Data
Aug. 8, 1973 Germany............................ 2340123

[52] U.S. Cl.............................. 128/2.1 R; 317/22
[51] Int. Cl................................................ A61b 5/04
[58] Field of Search ............ 128/2.06, 2.1P; 307/94, 307/235 A; 323/9; 328/7, 9 AG; 317/18 D, 27 R, 22, 14 C; 324/51

[56] References Cited
UNITED STATES PATENTS

| | | |
|---|---|---|
| 3,317,793 | 5/1967 | Peek et al. .......................... 317/27 R |
| 3,590,322 | 6/1971 | Carr .................................. 128/2.1 P |
| 3,617,812 | 11/1971 | Deter ................................. 317/27 R |
| 3,628,094 | 12/1971 | Billin ................................. 128/2.1 P |
| 3,706,008 | 12/1972 | Kremer ............................... 128/2.1 P |

Primary Examiner—William E. Kamm
Attorney, Agent, or Firm—Joel Wall; W. C. Nealon; H. R. Berkenstock, Jr.

[57] ABSTRACT

An overcurrent protective circuit. There is disclosed a circuit for automatically interrupting the flow of current in a critical conductor when that current exceeds a predetermined value. The disclosed circuit can interrupt the current flow for a predetermined time. The circuit has particular utility in conjunction with electro-medical patient monitoring equipment, where currents must be maintained below levels dangerous to the patient.

11 Claims, 6 Drawing Figures

OVERCURRENT PROTECTIVE CIRCUIT

BACKGROUND OF THE INVENTION

1. Field of the Invention

The present invention relates generally to the field of overcurrent protection devices, and more particularly relates to electro-medical patient monitoring equipment utilizng these overcurrent protection devices.

2. Description of Prior Art

In the electro-medical field, various electrical equipments are now being used to monitor, (which is herein intended to include measure, record, sense and stimulate) certain vital signs of a patient. For example, EKG recorders, heart pacemakers, breath rate monitors, heart pressure monitors, heart rate monitors, and EEG equipment are some of the more familiar pieces of electro-medical equipment. This equipment generally requires an electrical connection to the body of the patient. When several pieces of equipment are simultaneously connected, poor grounding of the equipment and other conditions can cause large currents to circulate through the body of the patient which can be fatal.

One prior art approach to the solution of patient electrocution problems utilizes optical coupling of electrical signals; this prevents large currents from flowing through the patient. For example, U.S. Pat. No. 3,742,947 discloses a particular optical coupling technique. Background material in this patent is hereby incorporated by reference.

As is well known, on connecting an electro-medical instrument to a patient, a current of more than 10 microamperes can mean endangering the patient's heart. In order to avoid this, in known instruments the original signal originating from the patient, and generally to be recorded, is converted into another type of optical or acoustic signal, (as described above) especially a high-frequency electromagnetic one, the physical nature of which now makes possible a galvanically-separating or electrically-isolated coupling between input signal on the patient's side, and output signal on the recording side. In this way, passage of any defective voltage in the instrument, conceivably possible after the transfer substation, is safely avoided. This is not guaranteed, however, if a defect occurs in the circuit before the galvanic-disconnecting or electrically-isolated point, which can then cause an endangering current over the patient's body.

Furthermore, overcurrent protective currents are already known for electro-medical instruments, which have resistance in connection leads between patient and instrument, through which defective currents are limited to 10 microamperes at most. The sizes of the resistances are proportioned corresponding to maximal operational voltage of the input circuit. This approach or measure has the disadvantage, however, that a resistance noise-voltage is produced, which can involve amplitude and thus accuracy of measurement of the bio-signal.

Hence it is the task of the present invention to construct a protective circuit in such a way that on the one hand, a transformation of the original signal into an optical or highfrequency signal is not required. Thus the endangering which is not entirely excluded by known circuits can be avoided. And on the other hand, no resistance of rather large proportions is required in the conduction or connection leads and thus no appreciable noise-voltage can occur.

SUMMARY OF THE INVENTION

The invention pertains to an overload protective circuit for a lead to be protected against overcurrent, especially for a medical instrument.

The present invention also relates to an overcurrent protective device for use with patient vital sign monitoring equipment. The device utilizes a small precision resistor in the conductor lead to be monitored, the value being sufficiently small to not present any resistance-originated noise problems. This resistor senses current amplitude and a comparator compares this sensed value with a reference value. A voltage or current actuated switch is made to open when the sensed value exceeds the reference value. The switch is made to remain open for a selectable predetermined period of time, after which it closes and permits the sensing resistor to sense current amplitude once again.

The present invention also relates to an improved EKG monitor which utilizes the aforementioned overcurrent device.

A special advantage of the present invention will be seen in the fact that such a type of protective circuit can be arranged as a closed block without difficulty at any preferred location of a lead to be protected, especially also, subsequently in instruments already in use. In other words, it can be added-on to existing instruments.

It is thus an object of the invention to provide an improved overcurrent protection device.

It is another object of the invention to provide improved patient vital sign monitoring apparatus, including EKG monitoring apparatus or equipment, utilizing certain overcurrent protection apparatus.

Other advantages and objects of the present invention will become apparent to one having reasonable skill in the art after referring to a detailed description of the appended drawings wherein:

DESCRIPTION OF THE PREFERRED EMBODIMENTS

Figure 1:
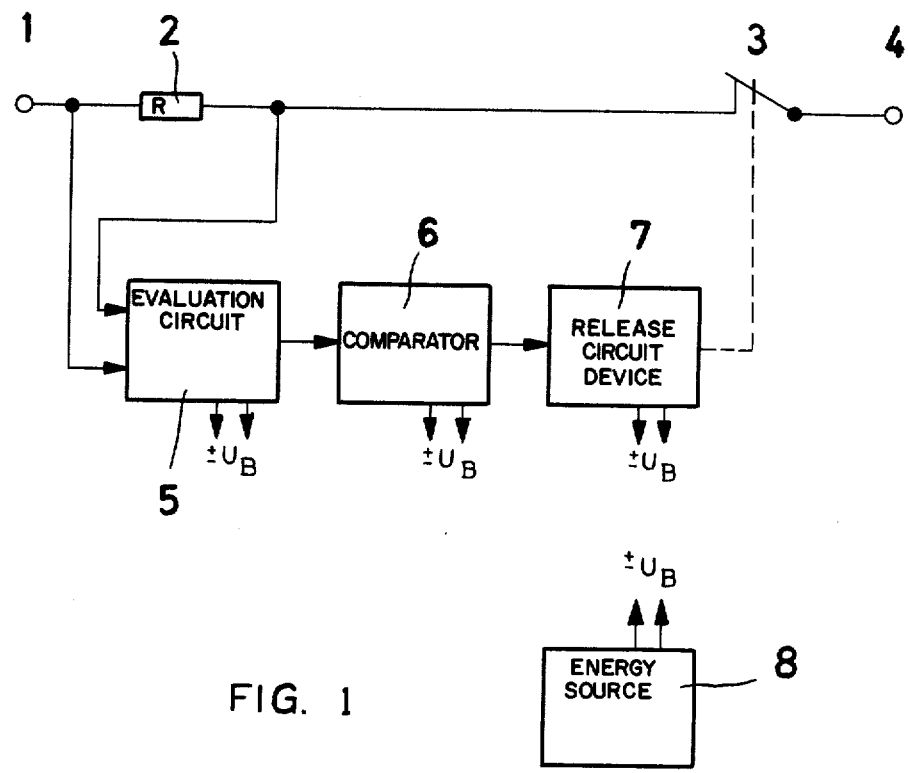
FIG. 1 depicts a first illustrative embodiment of the present invention.

The overcurrent protective circuit in FIG. 1 contains, in a lead 1–4 to be protected, a serial circuit consisting of precision resistance 2 and circuit-breaker or switch 3. The voltage drop on the precision resistance, proportional to current to be monitored in the lead, is conducted to evaluation circuit 5. There, a frequency-variable amplitude characteristic is achieved through a filter, and by means of full-wave rectification, dependence of the measuring (test) voltage on direction of current. The filtering and rectification are well known in the art and detail description thereof is not necessary for full understanding of the present invention. Output voltage of the evaluation circuit is compared in comparator circuit 6 with an adjustable reference voltage; the reference voltage corresponds to maximally permissible current of the lead 1–4 to be monitored. If permissible current is exceeded, the comparator circuit gives out an output signal, which is received in a release circuit 7, and moreover accomplishes a suspension of the lead 1–4 through circuit-breaker 4.

In order that no danger can occur if a defect occurs in the overcurrent protective circuit itself, it is essential that except on connections of signal input 1 and signal output 4, no type of electrical coupling exists which can bring about, a circuit or ground-loop over one of the connections 1 or 4 with an endangering current in the frequency range to be monitored. Such an endangering coupling is especially avoided by attachment of energy source 8 of the overcurrent protective circuit with a battery. In other words, the overcurrent circuitry can be battery-powered to avoid dangerous circuit paths.

Figure 2:
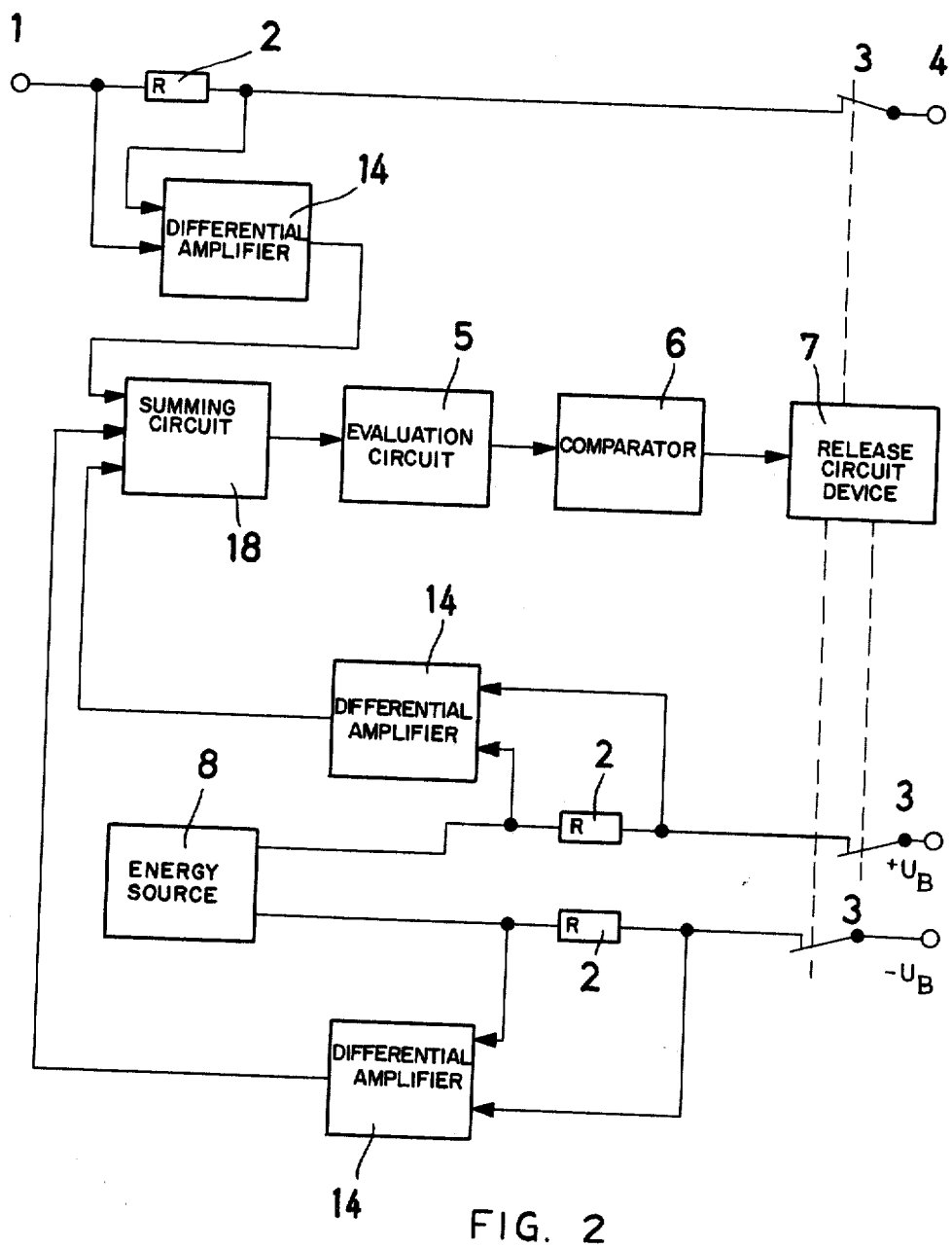
FIG. 2 depicts a second illustrative embodiment of the present invention.

FIG. 2 shows a circuit diagram of an exempilfication, in which connection to an energy source could indeed represent an endangering electrical coupling, not only in the signal conduction 1–4, but also in the precision resistances 2 located in energy source connections $+U_B$ and $-U_B$. The three voltages, which originate from currents through the three precision resistances, are transformed, in each case, in a differential amplifier 14 into a unipolar voltage signal, and these three voltages are added up in additive or cumulative voltage summer 18. The resultant voltage is proportional to current which flows through the lead of the signal input 1. The resultant voltage is further processed, as in the circuit according to FIG. 1; it accomplishes, however, an interruption of the signal lead and of both current supply leads. In this fashion, the interruption is independent of the magnitude of the currents through the connections of the energy source, which are adequately cancelled out through the differential sign, as long as no defect becomes operative. Thus, excessive currents resulting from power supply faults are protected against in this manner.

Figure 3:
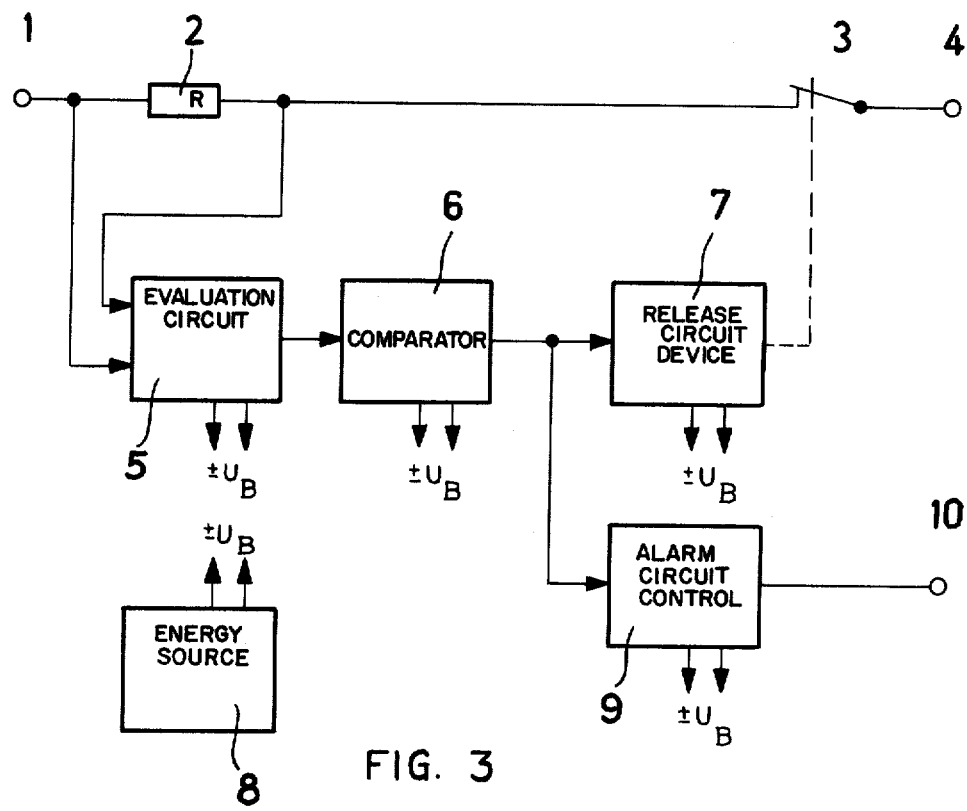
FIG. 3 depicts a third illustrative embodiment of the present invention.

FIG. 3 shows a circuit diagram of a further exemplification, in which the output signal of comparator circuit 6 is conducted to alarm signal circuit 9. This causes an incidence of defect to be directly recogniziable (especially through a lamp or an audio alarm sound), or else gives out an alarm signal without endangering electrical coupling. According to an analogous circuit according to FIG. 2, an additional precision resistance in alarm signal output conductor 10 can be used or protection can be made optoelectrically on alarm signal output 10 for another alarm signal demonstration or warning.

Figure 4:
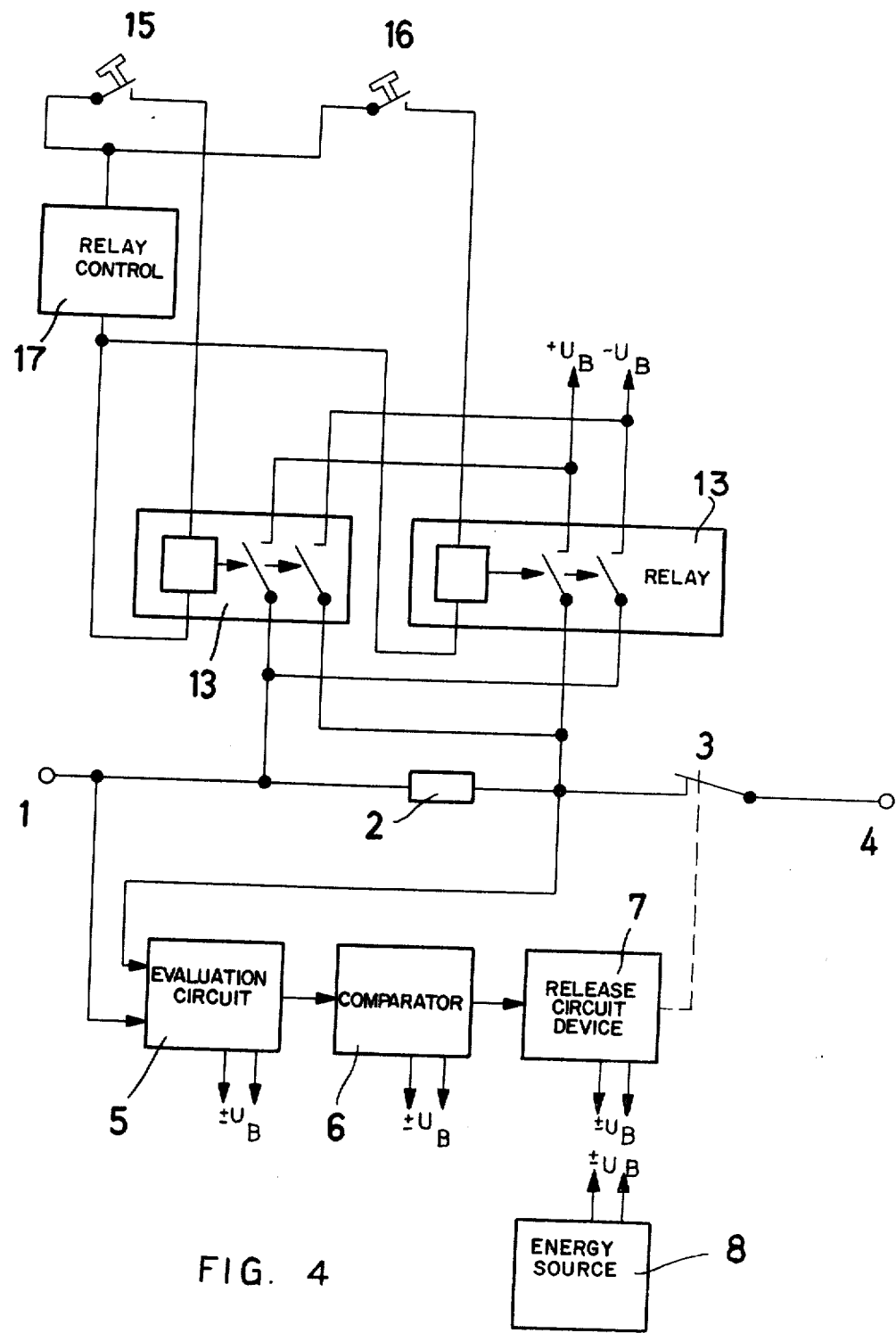
FIG. 4 depicts a test current exemplification for use with the present invention.

FIG. 4 shows a circuit diagram of a further exemplification including activation of switches or circuit-breakers 15 and 16 for a positive and for a negative test current direction respectively. With assistance of test current relay or circuit-breaker 13 and control circuit 17, a test current flows through the precision resistance 2, which causes circuit-breaker 3 to directly open, and demonstrates the functional capacity (efficiency). Thus, one can test the overcurrent protective apparatus with this exemplification. Control circuit 17 contains appropriate power supply circuitry to activate circuit breakers 13 when switches 15 or 16 are closed. Detail description of circuitry 17 is not necessary for complete understanding of the present invention.

Figure 5:
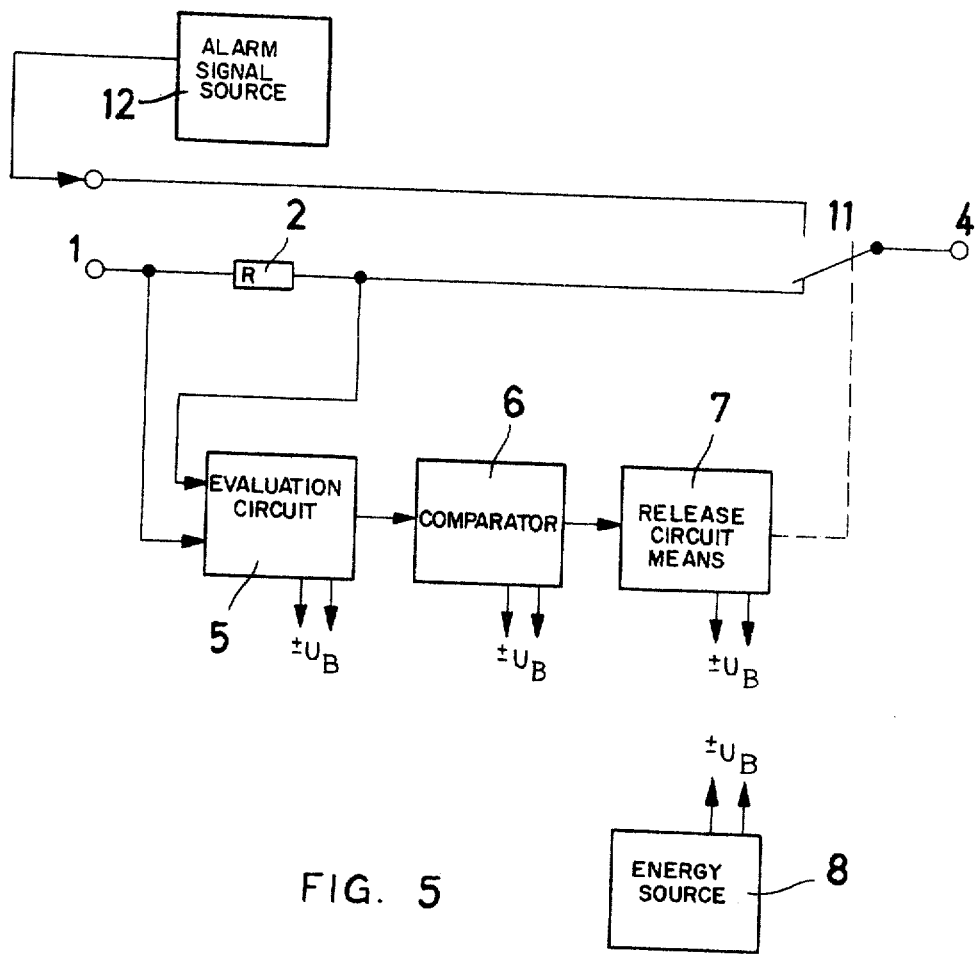
FIG. 5 depicts a fourth illustrative embodiment of the present invention.

FIG. 5 shows a circuit diagram of a further exemplification, in which release circuit 7 activates a further throw-over switch 11, which when the permissible current is exceeded in lead 1–4, interrupts this lead, and produces a linkage or connection between a connection of an alarm signal source 12 and signal output 4. An especially favorable result takes place in conjunction with the circuit according to FIG. 4, especially for medical recording instruments if, by means of a release key for a calibration signal, test current according to FIG. 4 flows through the precision resistance, the overcurrent protective circuit reacts, the throwover switch according to FIG. 5 is activated, a calibration voltage lies on the connection 12 as alarm signal source, and this calibration voltage is connected through, onto the signal output 4.

Figure 6:
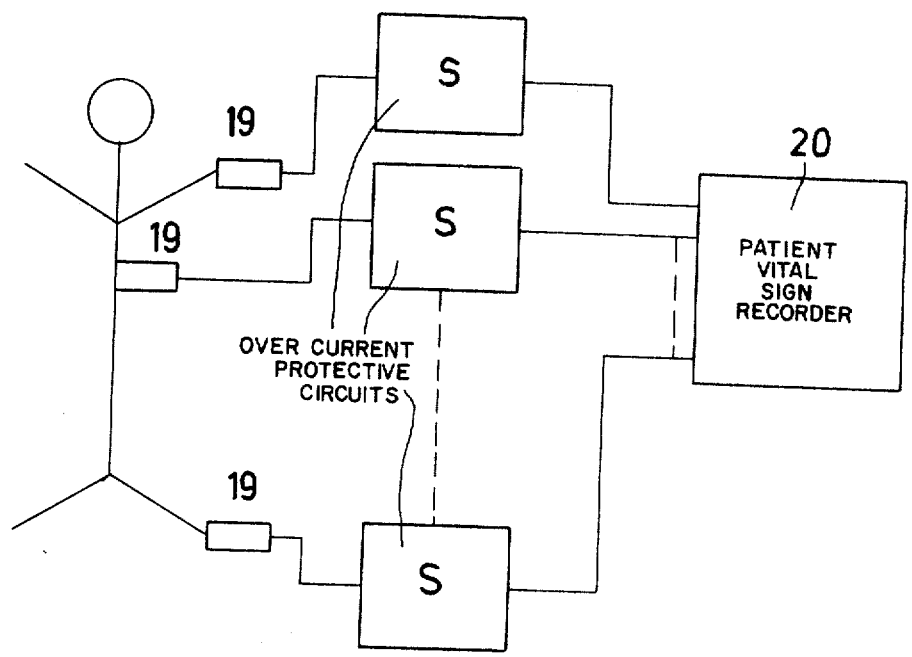
FIG. 6 depicts multi-interconnections, utilizing the present invention, between a patient and vital sign monitoring apparatus.

The circuit diagram represented in FIG. 6 shows the application of the overcurrent protective circuit S in patient leads between bio-signal receptor electrodes 19 and a bio-signal processing instrument or patient vital sign recorder 20.

The overcurrent protection device of the present invention is operable for predetermined periods of time. Release circuit 7, for example, may include timing circuitry of a standard nature such as a one-shot multivibrator. This circuitry is well known in the art and detailed description thereof is not deemed necessary for complete understanding of the present invention. After being triggered by, for example, a signal from comparator 6, a one-shot multivibrator changes from a stable state to an unstable state for a predetermined period of time; this time period can be the period when switch 3 is maintained open.

Switch 3 is, generally, a current or voltage operated switch. It could be a relay or a semiconductor or something else.

The invention may be embodied in yet another specific forms without departing from the spirit or essential characteristics thereof. Thus, the present embodiments are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An overcurrent patient-protective device for use with patient vital sign monitoring equipment, said device comprising means for sensing current flow between said equipment and said patient, means for converting said current flow to a DC voltage, means for generating a reference voltage, means for comparing said DC voltage with said reference voltage, means for generating a signal when said DC voltage exceeds said reference voltage, said signal generating means including means for maintaining said signal for a predetermined period of time, and electromechanical switch means responsive to operation of said signal generating means for interrupting said current flow for the duration of said signal.

2. A device as recited in claim 1 further comprising audio-visual alarm means and wherein said switch means further includes means for activating said alarm means.

3. A device as recited in claim 1 and wherein said sensing means comprises precision resistance means.

4. A device as recited in claim 3 and wherein said reference voltage generating means includes other means for activating said switch means when said current flow exceeds 4 microamperes.

5. A device as recited in claim 1 and wherein said converting means comprises rectifier circuit means.

6. A device as recited in claim 1 and wherein said comparing means comprises differential amplifier circuit means.

7. A device as recited in claim 1 and wherein said switch means comprises current-activated relay means.

8. A device as recited in claim 1 wherein said sensing means includes other means for sensing current flows in a plurality of conductors, and means for adding the respective current flows to provide a total current flow for said converting means.

9. A device as recited in claim 8 and wherein said sensing means comprises precision resistance means.

10. A device as recited in claim 9 and wherein said comparing means comprises differential amplifier circuit means.

11. Electro-medical patient monitoring equipment comprising circuit means for monitoring certain vital signs of said patient, terminal means for conductively connecting said patient to said circuit means, and over-current patient-protective means comprising seriatim: means for sensing current flow in said terminal means, means for converting said current flow to a DC voltage, means for generating a reference voltage, means for comparing said DC voltage with said reference voltage, means for generating a signal when said DC voltage exceeds said reference voltage, means for maintaining said signal for a predetermined period of time, and electromechanical switch means responsive to operation of said signal generating means for interrupting said current flow.

* * * * *